United States Patent Office 3,679,510
Patented July 25, 1972

3,679,510
WEATHER RESISTANT MOLDABLE LAMINATE
Kenneth E. Conley, Matthews, and Thomas M. Ellison, Charlotte, N.C., assignors to Riegel Paper Corporation, New York, N.Y.
No Drawing. Filed Aug. 6, 1970, Ser. No. 61,827
Int. Cl. B29f 5/00; B29g 5/00; B32b 27/00
U.S. Cl. 156—245                                    6 Claims

ABSTRACT OF THE DISCLOSURE

A low cost composite material having properties of high strength, easy moldability and excellent outdoor weathering characteristics, as well as a smooth and decorative outer surface is disclosed. The new composite material includes an outer layer of clear, reverse printed polyvinyl fluoride film adhesively bonded to a thermoplastic layer, which in turn is joined to a reinforced polyester base stratum. The exposed thermoplastic surface of the polyvinyl fluoride-thermoplastic laminate is joined to the reinforced polyester base stratum during curing and molding of the polyester material without the use of a laminating adhesive.

BACKGROUND OF THE INVENTION

Reinforced plastics, especially glass fiber reinforced polyester resins, are very popular structural materials for the fabrication of shaped articles such as boat hulls, automobile body parts, buoys, skis, sleds, luggage, etc. This popularity of reinforced plastics for these applications is based primarily on the low cost, high strength and easy moldability of these materials.

However, glass fiber reinforced polyester resin sheets do not have good weathering characteristics, and when used in outdoor applications must be protected from direct exposure to weathering. If not adequately protected from the ravages of outdoor exposure, glass fiber reinforced polyester resin surfaces erode with a resultant raising of glass fibers near the surface which permits water to enter the body of the structure and cause deterioration. Additionally, the raising of glass fibers near the surface of the material is unsightly and greatly detracts from the appearance of the final product.

Attempts to protect the surface of glass fiber reinforced polyester materials from weathering have included the use of surface coatings or overlays of various compositions to remove the glass fibers from the surface by covering them. However, these overlays have not proven to be effective in eliminating the weathering problems and function mainly to slow down the rate of deterioration rather than to eliminate it entirely.

The Sapper U.S. Pat. No. 3,257,266 considered these problems in detail and teaches the bonding of a polyvinyl fluoride layer to the surface of the fiber glass reinforced polyester sheet during curing of the polyester in order to protect the surface of the glass reinforced material from weathering deterioration. According to the teachings of the Sapper patent, an intermediate adhesive is not required between the polyester and the fluoride film if both strata are joined during curing and/or molding of the reinforced polyester layer.

In many of the applications for reinforced polyester materials, it is very desirable to provide a smooth and attractive surface appearance. Furthermore, it is often desirable to decorate the visible surface of the material with patterns such as wood grain, or other appropriate designs. When a polyvinyl fluoride outer film is used to protect the material from weathering, the desired decorative pattern may be imparted to the material by reverse printing the inner surface of the polyvinyl fluoride outer film and/or by embossing the outer surface.

It has been found in practice that when a polyvinyl fluoride film is joined to a reinforced polyester substrate during curing of the polyester resin, escaping gaseous products from the polyester curing reaction may disrupt the polyvinyl film layer making its appearance unattractive. Further, when the polyvinyl fluoride film layer is printed on its inner facing surface, i.e., reverse printed, with a decorative pattern, the serious problem of the ink formulation interacting wtih the polyester resin of the base material during the joining of the film to the polyester base is encountered.

The printing of the desired decorative pattern on the unexposed surface of the polyvinyl fluoride film outer layer, i.e., reverse printing, protects the printing ink from exposure to weathering without impairing its visibility since the polyvinyl film typically used is transparent. The applicants have found that polyester and acrylic base inks are very effective for printing polyvinyl fluoride film material. However, it has been observed that when polyester or acrylic base inks are in contact with the polyester resin reinforced base material during the joining-curing step, the ink invariably flows, thus destroying the preprinted decorative pattern and rendering the final product commercially useless.

It is the primary objective of the invention to provide a practical and economical solution to the problem of polyvinyl fluoride blistering and ink flow when a polyvinyl fluoride film is joined to a reinforced polyester substrate during curing and molding of the polyester material.

SUMMARY OF THE INVENTION

In accordance with the invention, the primary objective is achieved by providing an intermediate layer of a specific material having predetermined physical and chemical properties between the polyvinyl fluoride outer film layer and the reinforced polyester base layer. The final product of the invention is therefore a three layer molded laminate having a decorative weather resistant outer surface.

In further accordance with the invention, the intermediate layer provided between the polyvinyl fluoride film and the reinforced polyester base stratum should have the following properties:

(1) It should be adhesively joinable to the polyvinyl fluoride film layer by adhesives that are compatible with the printing ink used to reverse print the polyvinyl fluoride film.

(2) It should have a smooth surface.

(3) It should be bondable to the reinforced polyester base stratum during curing and molding without the need for a separate adhesive layer.

(4) It should function as a barrier to any reaction gases emitted by the polyester resin during curing.

Materials suitable for use as the intermediate layer include thermoplastic materials such as styrene polymers which have the necessary chemical reactivity with the polyester resin to provide the desired bond between the two layers. Included in this group of styrene polymers would be acrylonitrile butadiene styrene (ABS), polystyrene and styrene-acrylonitrile (SAN).

The polyvinyl fluoride film layer is preferably transparent, so that the reverse printed decorative pattern is visible. One surface of the polyvinyl fluoride film is printed with a desired decorative pattern such as wood grain, which is popular for many applications which include automobile trim, details, and side panels. The film is preferably printed with polyester-epoxy or acrylic printing inks and is subsequently laminated to a sheet of a suitable intermediate material by conventional laminating techniques. The laminating adhesive used to join the polyvinyl fluoride film to the thermoplastic layer must also be compatible with the printing ink, i.e., the laminating adhesive must not cause the ink to run, discolor or otherwise disrupt the decorative pattern.

The polyvinyl fluoride-intermediate layer sublaminate is then placed on a sheet of uncured Fiberglas reinforced polyester material in a molding press having the three dimensional configuration desired for the final product. The polyvinyl fluoride-intermediate layer-reinforced polyester composite is then subjected to heat and pressure and molded to the desired shape. During the molding operation, the polyester material takes the form of a very hard, high strength base stratum and the thermoplastic layer is chemically and physically joined to the reinforced polyester layer. The final product has all the toughness and other properties of a cured Fiberglas reinforced polyester material plus a decorative weather resistant outer surface.

DESCRIPTION OF PREFERRED EMBODIMENTS

In accordance with a preferred embodiment of the invention, the new weather resistant, decorative, high strength composite material is produced by first printing a desired decorative pattern on one surface of a clear polyvinyl film with a polyester-epoxy printing ink. The clear polyvinyl fluoride film used is available from the E. I. du Pont de Nemours Company, Wilmington, Del., under the trademark Tedlar. Preferably, the gauge of polyvinyl fluoride film used is less than about 2 mils in thickness. Prior to printing, the surface of the film to be printed can be activated to increase its receptiveness to the printing ink formulation. The surface activation can be done by any one of many techniques known in the art. However, it is preferred to use the chemical technique described in the Usala et al. U.S. Pat. 3,228,823. The chemical activation techniques taught by the Usala patent include the formation of functional groups selected from the group including hydroxyl, carboxyl, carbonyl, amino, amide, and ethylenically unsaturated radicals on the film surface.

The preferred printing ink formulation is a blend of an epoxy resin and a polyester resin plus conventional pigmentation. The weight ratio of the polyester to epoxy resins may range from approximately 90/10 to approximately 45/55 with 50/50 being preferred.

The polyester resin utilized in the printing ink can be chosen from the group including polyethylene isophthalate, polyethylene hexahydroterephthalate, copolyester of ethylene terephthalate and ethylene isophthalate, copolyester of ethylene terephthalate and ethylene hexahydroterephthalate or any mixture of the foregoing resins. Polyester resins of this type that are suitable for use in the printing ink formulation are described in U.S. Pat. No. 2,961,365, which also teaches their preparation.

The epoxy resin ingredient of the preferred printing ink formulation is a brominated high molecular weight epichlorohydrin bisphenol A type resin having an epoxide equivalent weight of about 500 and a bromine content between about 18 and 2%. A preferred epoxy resin from this class is obtainable from the Dow Chemical Company under the trade designation "DER 511."

Although printing inks in the foregoing category are preferred in the practice of the invention, any suitable ink for printing a decorative pattern on polyvinyl fluoride films can be utilized.

The printed surface of the polyvinyl fluoride film is then laminated by conventional techniques to a sheet of acrylonitrile butadiene styrene (ABS) thermoplastic using a suitable laminating adhesive. The ABS sheet material is typically about 0.20 inch thick. When polyester based printing ink is used to print the decorative pattern, it is advantageous to utilize a polyester based laminating adhesive.

The laminating adhesive utilized in joining the printed surface of the polyvinyl fluoride film to the thermoplastic substrate is preferably based on the same polyester resin as used in the printing ink formulation, except with slightly greater tacky characteristics and with a melting point between about 175° F. and 212° F. A preferred laminating polyester resin is available in solid form from E. I. du Pont de Nemours & Company under trade designation 49001 and in solution form with 30±2% resin solids in a ketone solvent under the trade designation "46960." An isocyanate additive is incorporated in the laminating adhesive for promoting crosslinking during the laminating step, which includes the application of heat and pressure to the joined webs. The isocyanate cross-linking agent is preferably the reaction product of trimethylol propane and toluene diisocyanate and may be added to the polyester resin in quantities ranging from 2% to 10%, preferably 5% to 7%, based on solids of polyester resin. If a background for the printed pattern on the polyvinyl fluoride film is desired in the final laminate, suitable pigmentation may be added to the laminating adhesive formulation.

The printed polyvinyl fluoride film-ABS sublaminate is then joined with an uncured Fiberglas reinforced polyester material preferably having a thickness of about 0.080 inch. Suitable thermosetting polyester resins are formed by the esterification reaction of dicarboxylic or polycarboxylic acids with polyols (di or multi functional organic alcohols). Improved chemical resistance, light stability and weather resistance are achieved by employing unsaturated di or polycarboxylic acids which may enter addition polymerization reactions with unsaturated monomers such as styrene, and methyl methacrylate. The addition reactions are initiated by peroxide catalysts such as benzoyl peroxide. The polyester resins may be formulated liquids or powders and may be pre-mixed with reinforcing glass fibers. A relatively recent development is the commercial availability of an uncured Fiberglas polyester matte which may be cut or shaped to fit the desired mold. Such a product is available under the trade name Vibrin-Mat from the Marco Chemical Division of W. R. Grace & Company, Linden, N.J.

The exposed ABS surface of the polyvinyl fluoride-ABS sublaminate is placed in contact with the uncured Fiberglas reinforced polyester material in a molding die having the desired configuration. Heat and pressure are then applied to the material. The applied heat and pressure molds the composite material into the desired shape, cures the polyester resin and chemically joins the ABS layer to the polyester layer.

In accordance with the invention, the molding die is preheated to about 300° F. before the composite material is introduced. Temperatures from about 280° F. to 350° F. have been tried with little if any difference in the end product. The composite material is subjected to a pressure of between about 2 and 3 tons while in the preheated mold for approximately 0.5 to 1.5 minutes, at which time it is removed. Generally, pressure requirements depend somewhat on the particular polyester resin formulation, but in general, pressure which will cause the resin to flow and fill the mold is sufficient. Sample parts have been molded in aluminum molds as thin as 0.035 in. using the Vibrin-Mat material. If too little pressure is applied, however, the final product is lumpy and rough. The cure time has also been varied from 30 seconds to 14 hours to determine its effect on the final product. It was found that, within these limits, a longer cure time resulted in a slightly tougher product with less embrittlement. However, curing times greater than a few minutes would not appear to be economically feasible for mass produced parts.

Similar composites were manufactured under the foregoing conditions utilizing the same materials except that polystyrene and styrene-acrylonitrile (SAN) thermoplastic layers were used in place of the ABS intermediate layer. It was found that virtually identical products were thereby produced and that, functionally the ABS, SAN and polystyrene intermediate layers were equivalent.

In accordance with the invention, the polyvinyl fluoride outer film, in addition to the protective and decorative functions discussed above, also function as a mold release agent for the composite material. The cured laminate is easily removed from the mold, without sticking as a result of the outer film layer. If desired, the outer surface can be embossed during the molding step by, for example, placing an embossing plate against the polyvinyl vinyl fluoride surface while in the molding press.

Although the forgoing embodiments are preferred, the techniques of the invention, of course, can be used to advantageously bond unprinted polyvinyl fluoride films, either transparent or opaque, to reinforced polyester base webs via use of a thermoplastic intermediate layer in order to avoid blistering or disruption of the film surface during molding. Further, the new techniques can be used to bond other materials, such as aluminum foil and cloth material to a reinforced polyester stratum by the use of an intermediate thermoplastic layer. A composite material of ABS, SAN or polystyrene bond cured to a Fiberglas reinforced polyester base material has also been found to be an advantageous, high strength, low cost moldable material, having a smooth and attractive outer surface. Such a composite would be suitable for indoor applications.

Unlike the product obtained when a polyvinyl fluoride film is joined directly to the reinforced polyester layer, during molding, the new composite has a smooth unblistered outer surface and a clear, undistorted decorative pattern. The reaction gases released during curing of the polyester material, which could cause blistering of the polyester film material, if allowed to freely escape are trapped by the intermediate thermoplastic layer a substantial distance from the film material. The new material is a significant improvement over prior reinforced polyester materials by providing a highly attractive, weather resistant surface without impairing the moldability or the high strength characteristics of the reinforced material.

It is to be understood that the specific embodiments herein described are intended to be representative only, as certain changes may be made therein without departing from the clear teachings of the disclosure. Accordingly, reference should be made to the following appended claims in determining the full scope of the invention.

What is claimed is:

1. A method for producing a composite material having a surface material bonded thereon with characteristics incompatible with the structural backing material thereof, the steps which comprise preselecting a film-like layer of thermoplastic material from the group consisting of acrylonitrile-butadiene-styrene terpolymer, polystyrene, and styrene-acrylonitrile copolymer; laminating said thermoplastic film-like material from said pre-selecting step to a film layer of polyvinyl fluoride to form a sublaminate; placing said sublaminate in a molding zone; introducing a structural backing material comprised of a Fiberglas reinforced uncured polyester resin into said molding zone behind said sublaminate and against the thermoplastic layer thereof; shaping said sublaminate as desired in said molding zone; and applying heat and pressure to said molding zone for the bonding of said structural backing material to said thermoplastic material layer of said sublaminate.

2. A method as recited in claim 1, in which said pressure applied in said applying step is within the range of between about 2–3 tons for a period of time within the range of between about 30 seconds and 14 hours.

3. A method as recited in claim 1, which includes the additional step of reverse printing said polyvinyl fluoride film prior to said laminating step, the printed surface side of said polyvinyl fluoride film layer being joined with said thermoplastic film layer in said laminating step.

4. A method as recited in claim 3, which includes the additional step of chemically activating said polyvinyl fluoride film layer prior to said reverse printing step.

5. A method as recited in claim 3, in which said reverse printing step is carried out with an ink comprised of a polyester resin and an epoxy resin in the ratio within the range of between about 90/10–45/55 by weight.

6. A method as recited in claim 5, in which said weight ratio is 50/50.

References Cited

UNITED STATES PATENTS

| | | | |
|---|---|---|---|
| 3,265,556 | 8/1966 | Hungerford et al. | 161—233 X |
| 3,451,876 | 6/1969 | Edelmann et al. | 161—189 X |
| 3,421,971 | 1/1969 | Kamal | 161—256 X |
| 3,133,854 | 5/1964 | Simms | 161—189 |
| 3,111,450 | 11/1963 | Stevens | 161—189 |
| 2,931,750 | 4/1960 | Goms | 161—195 X |
| 3,300,927 | 1/1967 | Bettoli | 161—189 X |
| 3,421,973 | 1/1969 | Kamal | 161—189 |
| 3,458,391 | 7/1969 | Miller | 161—189 |
| 3,475,248 | 10/1969 | Brasure | 156—229 |

HAROLD ANSHER, Primary Examiner

U.S. Cl. X.R.

156—182, 309; 161—188, 189, 194, 255, 256; 264—263